United States Patent
Balani et al.

(10) Patent No.: US 11,176,124 B2
(45) Date of Patent: *Nov. 16, 2021

(54) MANAGING A SEARCH

(71) Applicant: International Business Machines Corporation, Armonk, NY (US)

(72) Inventors: Naveen G. Balani, Mumbai (IN); Amit P. Bohra, Pune (IN); Abhishek Shrivastava, Pune (IN)

(73) Assignee: International Business Machines Corporation, Armonk, NY (US)

(*) Notice: Subject to any disclaimer, the term of this patent is extended or adjusted under 35 U.S.C. 154(b) by 409 days.

This patent is subject to a terminal disclaimer.

(21) Appl. No.: 16/223,435

(22) Filed: Dec. 18, 2018

(65) Prior Publication Data

US 2019/0121806 A1    Apr. 25, 2019

Related U.S. Application Data

(63) Continuation of application No. 14/477,922, filed on Sep. 5, 2014, now Pat. No. 10,176,227, which is a
(Continued)

(51) Int. Cl.
*G06F 16/00* (2019.01)
*G06F 16/242* (2019.01)
(Continued)

(52) U.S. Cl.
CPC ........ *G06F 16/2425* (2019.01); *G06F 16/248* (2019.01); *G06F 16/24522* (2019.01);
(Continued)

(58) Field of Classification Search
CPC .......... G06F 16/90332; G06F 16/2425; G06F 16/3338; G06F 16/24522; G06F 16/24578; G06F 16/248
See application file for complete search history.

(56) References Cited

U.S. PATENT DOCUMENTS

| 6,385,602 B1 | 5/2002 | Tso |
| 7,428,530 B2 | 9/2008 | Ramarathnam |

(Continued)

FOREIGN PATENT DOCUMENTS

| CN | 101820592 A | 9/2010 |
| CN | 104699737 A | 6/2015 |

OTHER PUBLICATIONS

Demartini, Gianluca, and Stefan Siersdorfer. "Dear search engine: what's your opinion about . . . ? sentiment analysis for semantic enrichment of web search results." Proceedings of the 3rd international semantic search workshop. 2010.*

(Continued)

*Primary Examiner* — Nan Hutton
(74) *Attorney, Agent, or Firm* — Scott S. Dobson

(57) ABSTRACT

A set of first results from a first query are received. Using a natural language processing technique, a set of second results using a second query having at least a portion of the first query and at least a portion of set of first results are generated, wherein the natural language processing technique comprises a machine learning model configured to analyze the set of first results. The set of second results are scored based upon a semantic comparison of the set of first results, the second query, and the set of second results. Using the scored set of the second results, a set of processed results are generated.

20 Claims, 5 Drawing Sheets

Related U.S. Application Data continuation of application No. 14/100,336, filed on Dec. 9, 2013, now Pat. No. 9,996,588.

(51) Int. Cl.

| | |
|---|---|
| *G06F 16/2457* | (2019.01) |
| *G06F 16/951* | (2019.01) |
| *G06F 16/33* | (2019.01) |
| *G06F 40/30* | (2020.01) |
| *G06F 16/2452* | (2019.01) |
| *G06F 16/248* | (2019.01) |

(52) U.S. Cl.
CPC .... *G06F 16/24578* (2019.01); *G06F 16/3338* (2019.01); *G06F 16/951* (2019.01); *G06F 40/30* (2020.01)

(56) References Cited

U.S. PATENT DOCUMENTS

| | | | |
|---|---|---|---|
| 7,523,095 B2 | 4/2009 | Gates | |
| 7,620,628 B2 | 11/2009 | Kapur | |
| 7,966,323 B2 | 6/2011 | Bocking | |
| 8,341,143 B1 | 12/2012 | Karls | |
| 8,498,984 B1 | 7/2013 | Hwang | |
| 9,715,493 B2 * | 7/2017 | Papadopoullos | G06F 16/904 |
| 9,996,588 B2 | 6/2018 | Balani | |
| 10,169,450 B2 * | 1/2019 | Allen | G06F 16/243 |
| 2006/0074860 A1 | 4/2006 | Ishiguro | |
| 2007/0124263 A1 * | 5/2007 | Katariya | G06F 16/3334 706/14 |
| 2007/0192293 A1 | 8/2007 | Swen | |
| 2008/0052277 A1 * | 2/2008 | Lee | G06F 16/3322 |
| 2009/0119261 A1 * | 5/2009 | Ismalon | G06F 16/3322 |
| 2009/0171933 A1 | 7/2009 | Schachter | |
| 2009/0198667 A1 | 8/2009 | Groeneveld | |
| 2011/0119243 A1 | 5/2011 | Diamond | |
| 2012/0022950 A1 * | 1/2012 | Gilbert | H04M 3/53333 705/14.66 |
| 2012/0047148 A1 | 2/2012 | Guo | |
| 2012/0203778 A1 * | 8/2012 | Riley | G06F 16/3338 707/731 |
| 2012/0246165 A1 | 9/2012 | Batraski | |
| 2013/0054569 A1 * | 2/2013 | Mo | G06F 16/248 707/722 |
| 2013/0268911 A1 | 10/2013 | Charfi | |
| 2015/0058417 A1 | 2/2015 | Mcconnell | |
| 2015/0161260 A1 | 6/2015 | Balani | |
| 2020/0234180 A1 * | 7/2020 | Sheikh | G06N 20/00 |

OTHER PUBLICATIONS

Finkelstein, Lev, et al. "Placing search in context: The concept revisited." Proceedings of the 10th international conference on World Wide Web. 2001.*

Kassim, Junaidah Mohamed, and Mahathir Rahmany. "Introduction to semantic search engine." 2009 International Conference on Electrical Engineering and Informatics. vol. 2. IEEE, 2009.*

Chen et al., "A Machine Learning Approach to Inductive Query by Examples: An Experiment Using Relevance Feedback, ID3, Genetic Algorithms, and Simulated Annealing", Journal of the American Society for Information Science, Jun. 1998. 49(8):693-705.

China Search Report, Reference IN920130193CN1, Application No. CN201410670369.3, dated Jul. 4, 2017, 2 pages.

CN Office Action, Reference IN920130193CN1, Application No. CN201410670369.3, dated Jul. 12, 2017, 15 pages.

Finkelstein et al., "Placing Search in Context: The Concept Revisited", Zapper Technologies, Inc. ACM Transactions of Information Systems, vol. 20, No. 1, Jan. 2002, pp. 116-131.

Johnson, N., "Google Serves Up Search Within Search Results," Mar. 6, 2008, Incisive Interactive Marketing LLC., New York, NY, ©2013, 2 pages, <http://searchenginewatch.com/article/2054690/Google-Serves-Up-Search-Within-Search-Results>.

Lee, B., et al., "Search within a site: A tale of teleportation," Mar. 5, 2008, 8 pages, <http://googleblog.blogspot.in/2008/03/search-within-site-tale-of.html>.

List of IBM Patents or Patent Applications Treated as Related. Filed Dec. 18, 2018. 2 pages.

Maddox, S., et al., "Ranking of Search Results," May 18, 2010, Licensed under Creative Commons Attribution 2.5 Australia License, 5 pages, <http://web.archive.org/web/20101213212718/http://confluence.atlassian.com/display/DOC/Ranking+of+Search+Results>.

Marklogic, "Relevance Scores: Understanding and Customizing," Search Developer's Guide, Chapters, Copyright © 2013 MarkLogic Corporation, 9 pages, <http://docs.marklogic.com/guide/search-dev/relevance>.

McCandless, M., et al., "Lucene in Action" Jul. 28, 2010. Second Edition, section 5.6. Manning Publications, 2 pages, <http://my.safaribooksonline.com/book/web-development/seo/9781933988177/advanced-search-techniques/ch05lev1sec6>.

McGee, M., "Google Testing New 'Search Within' Tool; Also, Bigger URLs In Search Results," Mar. 14, 2013, © 2013 Third Door Media, Inc., 3 pages, <http://searchengineland.com/google-testing-new-search-within-tool-also-bigger-urls-in-search-results-151629>.

Narayanareddy, J., et al., "Method and System for Increasing the Relevancy of Search Results Using Categories of Related Terms," Feb. 17, 2011, ©Yahoo! 2011, IP.com No. IPCOM000204188D, 5 pages, <http://ip.com/pdf/ipcompad/IPCOM000204188D.pdf>.

Unknown, "A Search Within a Search—How This Could Mean Bad News for Your Site," Seosmarty, 18 pages, <http://www.seosmarty.com/search-within-search/.

Unknown, "Two-step approach to supervised and unsupervised learning for grouping of search-results," May 18, 2010, IP.com Prior Art Database Technical Disclosure, IP.com No. IPCOM000195810D, 8 pages.

Zhou, et al., "SPARK: Adapting Keyword Query to Semantic Search," The Semantic Web, ISWC/ASWC 2007, ©Springer-Verlag, Berlin, Heidelberg, 2007, pp. 694-707.

* cited by examiner

MANAGING A SEARCH

This disclosure relates generally to computer systems and, more particularly relates to managing a search.

BACKGROUND

The amount of data and information available on the internet and other communication networks is growing rapidly. Search engines are one tool by which a user may find desired information. As the amount of available information increases, the need for managing searches and search results may increase.

SUMMARY

Aspects of the present disclosure, in certain embodiments, are directed toward a computer program product for managing a search. In certain embodiments, the computer program product can include a computer readable storage medium having program instructions embodied therewith, wherein the computer readable storage medium is not a transitory signal per se, the program instructions executable by a computer to perform a method. The method can include receiving a set of first results from a first query. The method can include generating, using a natural language processing technique, a set of second results using a second query having at least a portion of the first query and at least a portion of set of first results, wherein the natural language processing technique comprises a machine learning model configured to analyze the set of first results. The method can include scoring the set of second results based upon a semantic comparison of the set of first results, the second query, and the set of second results. The method can also include generating, using the scored set of the second results, a set of processed results.

Aspects of the present disclosure, in certain embodiments, are directed toward a system for managing a search. In certain embodiments, the system can include one or more processors and a memory communicatively coupled to the one or more processors, wherein the memory comprises instructions which, when executed by the one or more processors, cause the one or more processors to perform a method. The method can include receiving a set of first results from a first query. The method can include generating, using a natural language processing technique, a set of second results using a second query having at least a portion of the first query and at least a portion of set of first results, wherein the natural language processing technique comprises a machine learning model configured to analyze the set of first results. The method can include scoring the set of second results based upon a semantic comparison of the set of first results, the second query, and the set of second results. The method can also include generating, using the scored set of the second results, a set of processed results.

Aspects of the present disclosure, in certain embodiments, are directed toward a method for managing a search. The method can include identifying a first query. The method can include conducting, using the first query, a first search, which yields a set of first results and identifying a set of categories based on the set of first results from the first query. The method can include generating a derived query using at least a portion of the first query, at least a portion of the first results, and at least a portion of the set of categories, wherein the derived query is distinct from the first query. The method can include generating, using the derived query, a set of derived results. The method can include analyzing, with a natural language processing technique configured to analyze syntactic and semantic elements, the first query, the derived query, the set of derived results, and aggregate data from a third query related to the first query. The method can include comparing at least one first feature of a first group of the set of derived results with at least one second feature of a second group of the set of derived results. The method can include scoring the set of derived results based upon a relationship of the first query, the derived query, and the set of derived results and scoring higher a selected grouping of the first and second groups that includes a similar feature, of the first and second features, to a third feature of the first query.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments of the invention and do not limit the disclosure.

Figure 1:
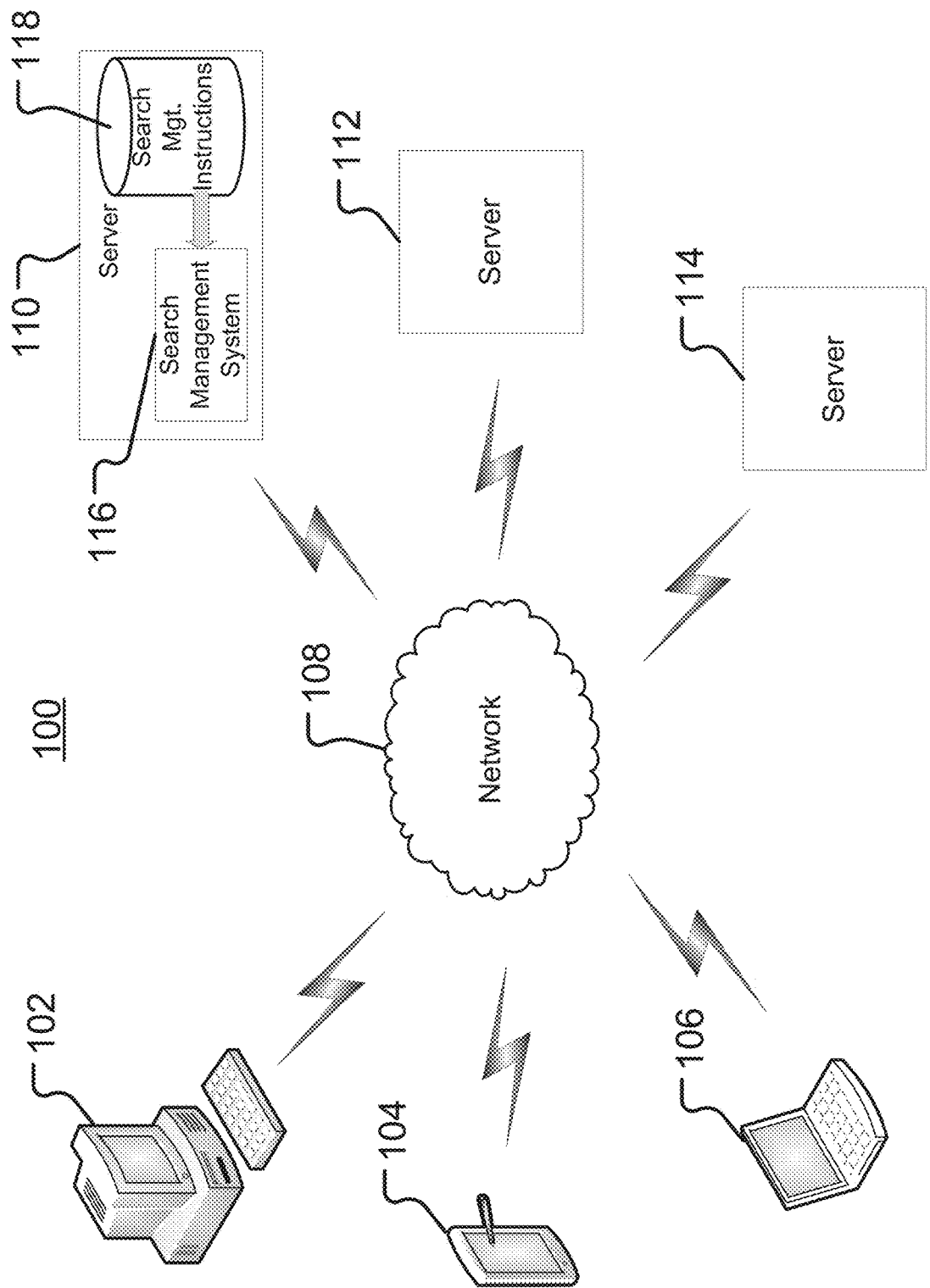
FIG. 1 illustrates a high-level example of a network architecture, according to embodiments.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Aspects of the present disclosure provide a methodology for managing a search. The methodology can receive a set of primary search results generated in response to an initial search query. A set of derived search results may be generated by a secondary query based on the initial search query and the primary search results. The methodology may score the derived search results based on their similarity with the initial search query, the secondary search query and the derived search results.

Aspects of the present disclosure relate to the recognition that, in certain situations, the search results generated for a search query input by a user may not contain the information that the user was seeking. As a result, the user may have to perform an additional search, or revise the initial search query. Further, although search engines can provide suggestions or related searches based on search query, this information may be limited, or not relevant to the intended search of the user. Accordingly, aspects of the present disclosure relate to a method and system for managing search results that can provide customized information for the user based upon the initial search query and the primary search results. Additionally, aspects of the present disclosure relate to automatically performing one or more derived information searches based on the initial search query and the primary search results. The present disclosure may provide benefits associated with increased search efficiency and saving a user the time of performing multiple searches.

Aspects of the present disclosure include a method and system for managing search results. The method and system may work on a number of devices and operating systems. The method and system can include receiving a set of first results (e.g., web pages) generated in response to a first search query. Aspects of the present disclosure can include identifying a set of categories based on the set of first results. Identifying the set of categories can include the use of a natural language processing technique to examine metadata from the set of first results. For example, the set of categories can be identified based on syntactic and semantic elements present in the set of first results. The natural language processing technique can include a machine learning model trained to identify keywords and data tags in the set of first results that can be used in determining the set of categories.

Aspects of the present disclosure can include generating a set of second results using a second query having at least a portion of the first query, at least a portion of the first results, and at least a portion of the set of categories. Generating the set of second results can include filtering to remove at least one redundant feature of the set of second results. For example, a feature of the second results may be redundant with one or more features of the first results and be eliminated from the set of second results. Further, generating the set of second results can allow a user to select a category from the set of categories to additionally filter the set of second results.

Aspects of the present disclosure can include scoring the set of second results based upon a relationship of the first query, the second query, and the set of second results. The relationship can include a semantic comparison based on the similarity of textual content between the first query, the second query, and the set of second results. Further, the relationship can be determined by a natural language processing technique configured to analyze aggregate data from a third query, a syntactic element at least in part associated with word frequency, and a semantic element at least in part associated with word meaning. In embodiments, the third query can be related to the first query and common search criteria. Scoring the set of second results can include classifying the second results as belonging to a particular category of the set of categories. Consistent with various embodiments, scoring the set of second results can also include comparing at least one first feature of a first group of the second set of results with at least one second feature of a second group of the second set of results; and scoring higher a selected grouping of the first and second groups that includes a similar feature, of the first and second features, to a third feature of the first query. Aspects of the present disclosure provide a methodology for managing search results that may have positive effects associated with increased search relevancy and efficiency.

Turning now to the figures, FIG. 1 illustrates a high-level example of a network architecture 100, consistent with embodiments of the present disclosure. Aspects of FIG. 1 are directed toward a network architecture that facilitates the implementation of an application for managing a search. The network architecture 100 is presented to show one example of an environment where a system and method in accordance with the present disclosure may be implemented. The network architecture 100 is presented only by way of example and is not intended to be limiting. The system and methods disclosed herein may be applicable to a wide variety of different computers, servers, storage devices, and network architectures, in addition to the network architecture 100 shown.

As shown in FIG. 1, the network architecture 100 can include one or more client devices 102, 104, 106 interconnected by a network 108. The client devices can include computers, tablets, Personal Digital Assistants (PDAs), smartphones, and other devices. The network 108 can include, for instance, a local-area-network (LAN), a wide-area-network (WAN), the Internet, an intranet, or the like (and various combinations thereof). Consistent with various embodiments, the network architecture can also include one or more server computers 110, 112, 114 (alternately referred to as "host systems" or "host devices"). In certain embodiments, client devices 102 can initiate communication sessions, whereas server computers 110 can wait for requests from the client devices 102.

Consistent with various embodiments, the server computers 110 may host systems and applications for access by client devices 102. Aspects of the present disclosure are directed toward a search management system 116 that can be hosted by one or more server computers 110 and accessed by one or more client devices 102. In certain embodiments, the client devices 102 can submit search queries over the network 108 to one or more of the server computers 110, where the search management system 116 can process the search query and return result data to the client devices 102.

In certain embodiments, the server computers 110 can also host a search management instructions database 118. The search management instructions database 118 can maintain stored search instructions that can be accessed by the search management system 116. For example, in certain embodiments, the server computer 110 can receive a search query from the client device 102, and the search management system 116 can access the instructions database 118 for instructions regarding managing the search. For example, the search management instructions database 118 can maintain instructions regarding identifying a set of categories based on the results of the search query. Other search management instructions are also possible. Consistent with various embodiments, the search management system can facilitate a primary search and one or more derived information searches to provide customized information for a user based upon the initial search query and the primary search results.

Figure 2:
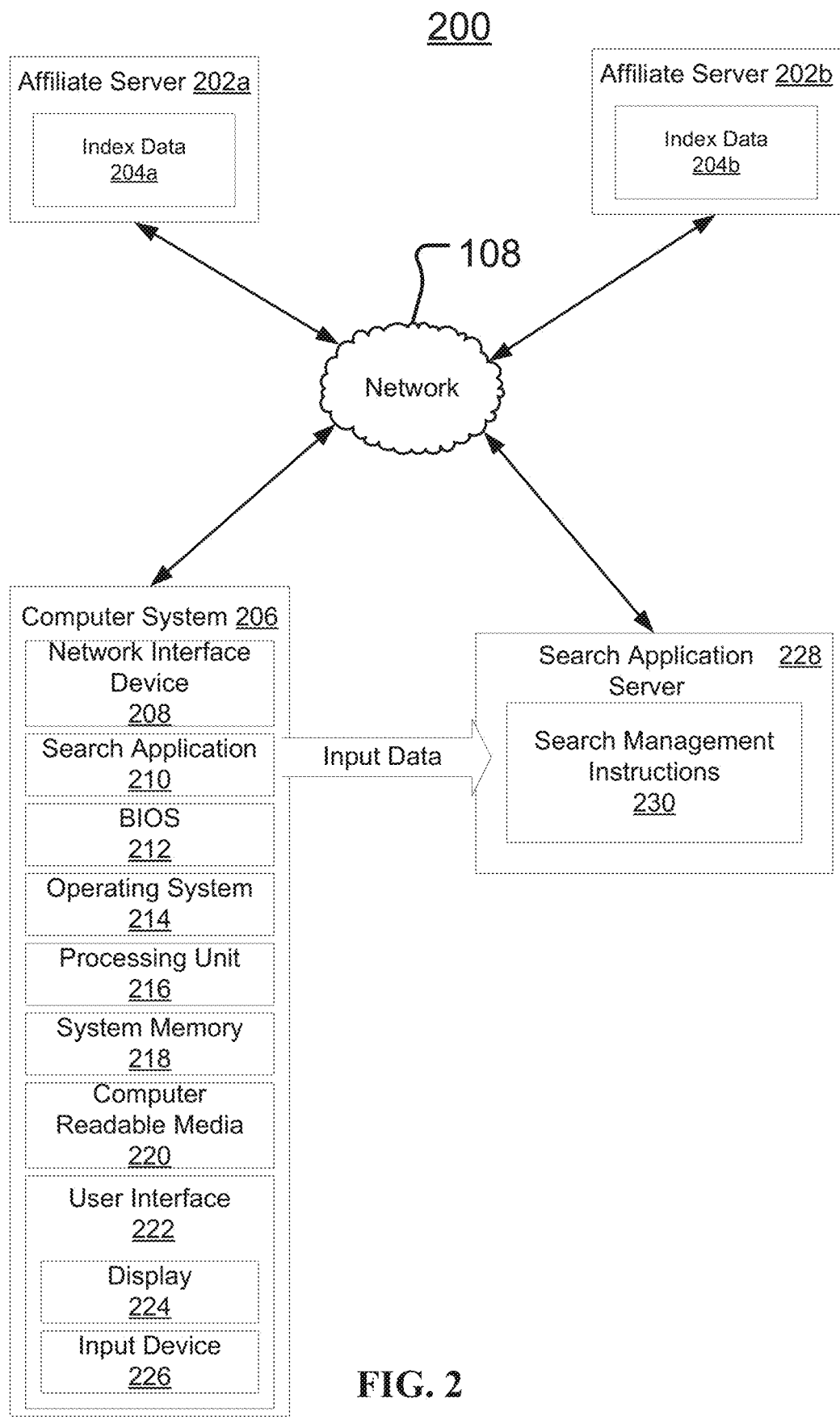
FIG. 2 illustrates an example network architecture for a search managing system, according to embodiments.

FIG. 2 illustrates an example network architecture 200 for a system to manage a search, consistent with embodiments of the present disclosure. Aspects of FIG. 2 are directed toward a network architecture 200 that facilitates the implementation of an application for managing a search. Consistent with various embodiments, the network architecture 200 can include one or more affiliate servers 202a, 202b, a computer system 206, and a search application server 228 communicatively connected via a network 108. The affiliate servers 202a and 202b can include index data 204a, 204b that can be accessed by the search application server 226 via the network 108. The index data 204a can, for example, be a database, a web page, a digital encyclopedia, or the like.

Consistent with embodiments of the present disclosure, the network architecture 200 can include a computer system 206. The computer system 206 can include a network interface device 208, a search application 210, a BIOS (basic input-output system) 212, an operating system 214, one or more processors or processing units 216, a system memory 218, some form of computer-readable media 220, and a user interface 222. The network interface device 208 can facilitate communication between the computer system 206 and the network 108. In certain embodiments, the various components of the computer system 206 can be coupled together by a system bus.

As shown in FIG. 2, the computer system 206 can include one or more forms of computer-readable media 220. For example, computer-readable media can include storage media, such as random-access memory (RAM), read-only memory (ROM), electrically erasable programmable read-only memory (EEPROM), flash memory, hard disks, optical disk storage, or other mediums that can be used to store information that can be accessed by the computer system 206. Additionally, computer-readable media can include communication media, such as computer-readable instructions, data structures, and program modules. Wired media, such as a wired network or a direct-wired connection, and wireless media, such as acoustic, radio frequency, infrared, and other wireless media are further examples of communication media. Combinations of the above are also included within the scope of computer-readable media.

In certain embodiments, the computer system 206 can include a BIOS 212 and an operating system 214 accessible by the system memory 218. The BIOS 212 and the operating system 214 can facilitate the transfer of information between elements within the computer system 206, as well as the implementation of application programs and other program modules. A user interface can also be linked to the computer system 206 that allows a user to interact with the application programs and program modules of the computer system 206. For example, the user interface can include a display 224 such as a computer monitor, and an input device 226 such as a keyboard or a pointing device (e.g., a mouse, trackball, pen, or touch pad).

Consistent with various embodiments, the computer system 220 can include a search application 210. The search application 210 can be executable by the computer system 220, and can be responsive to user input data for initiating a search query for the retrieval of information, such as web pages, HTML documents, and the like. In certain embodiments, the search application 210 can be configured to communicate with a search application server 228 to facilitate the implementation of the user's search query to retrieve information.

Consistent with various embodiments, the network architecture 200 can include a search application server 228. The search application server 228 can include search management instructions 230 that can facilitate the implementation of search query by a user to retrieve information. In certain embodiments, the search management instructions 230 can include authenticating the search query, and executing a search engine application that queries the index data 204a, 204b stored on each affiliate server 202a, 202b for information or document data that matches the user defined search query data. For example, a user using the computer system 206 can input a search term such as "puppies" into search application 210, and submit a search query for the term "puppies" to the search application server 228. The search management instructions 230 on the search application server 228 can query the index data 204a, 204b stored on each affiliate server 202a, 202b for information or document data that matches the term "puppies" and carry out retrieval of the corresponding information or document data, additional management steps, and returning the results to the computer system 206 to be viewed by the user.

Consistent with various embodiments, the search management instructions 230 can include instructions regarding identifying a set of categories based on a set of search results in response to a primary search query, generating a set of derived search results based on the identified categories, and scoring the derived search results. Aspects of the search management instructions may provide benefits associated with increased search efficiency and saving a user the time of performing multiple searches.

Figure 3:
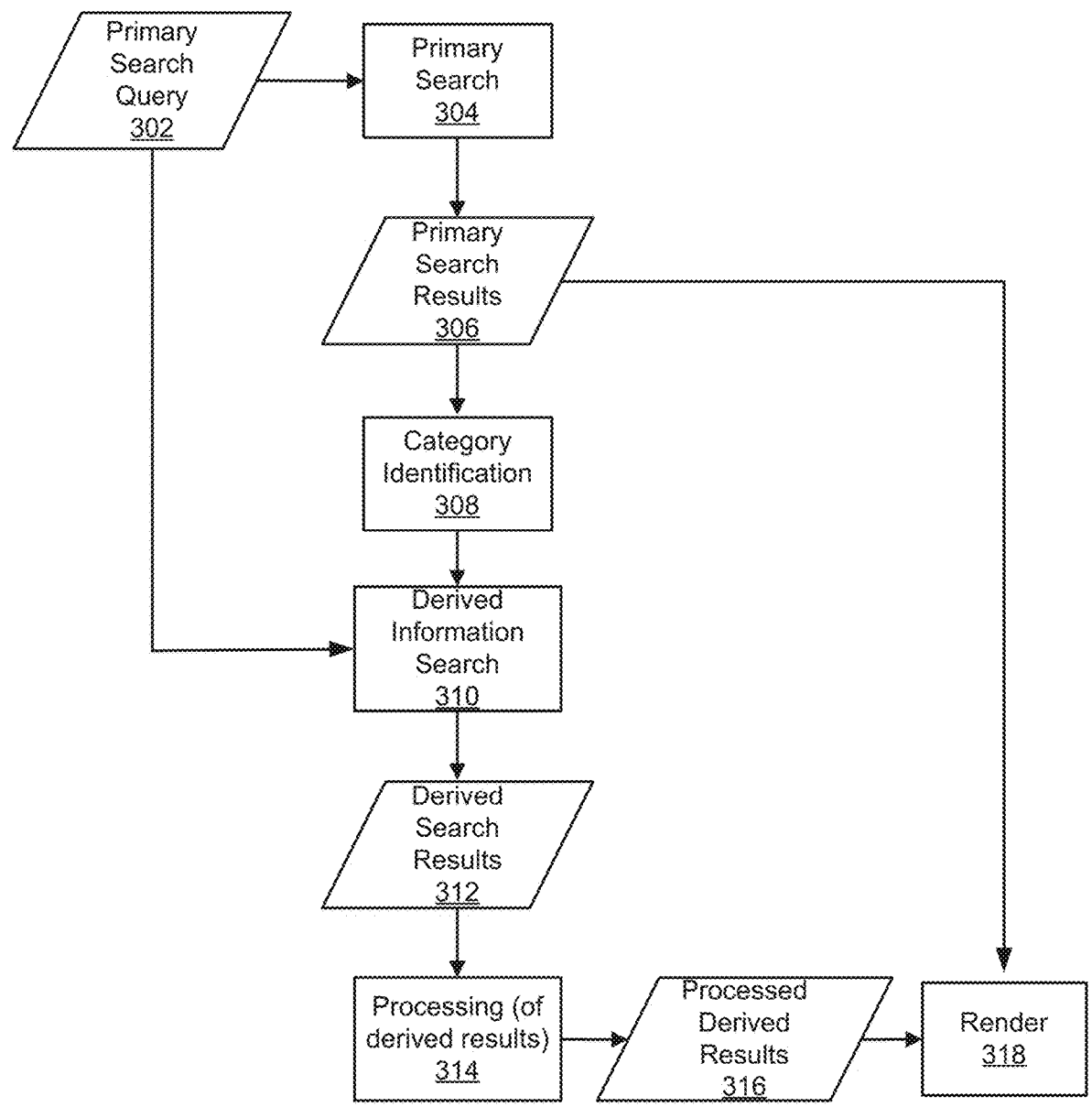
FIG. 3 illustrates a high level flow-diagram for a search managing system, according to embodiments.

FIG. 3 illustrates a high level flow-diagram for a system to manage a search 300, consistent with embodiments of the present disclosure. Aspects of FIG. 3 are directed toward generating a set of derived search results from a primary search query, and processing the derived results. Consistent with various embodiments, the search managing system 300 can include allowing a user to input a primary search query 302 into a search engine. The primary search query 302 can be, for example, a web search request input by a user into an internet search engine. The primary search query 302 can be used to conduct a primary search 304. The primary search 304 can include searching a web database, archive, index, or other information storage system for keywords or data tags that match or are related to terms in the primary search query 302.

Consistent with various embodiments, the primary search 304 can generate a set of primary search results 306. The primary search results 306 can include web sites, online encyclopedias, images, videos, news articles, documents and the like. In certain embodiments, a category identification process 308 can be conducted to determine a set of categories using syntactic and semantic elements present in the primary search results 306. In certain embodiments, the syntactic and semantic elements can be analyzed by a natural language processing technique based on a machine learning model. Consistent with various embodiments, instructions for identifying the categories can be stored on a database (such as search management database 118 of FIG. 1) and accessed by a search management system (such as search management system 116 of FIG. 1).

In certain embodiments, the primary search query 302 and the primary search results 306 can be used to perform a derived information search 310. The derived information search 310 can include searching a web database, archive, index, or other information storage system for keywords or data tags that are related to terms in the primary search query 302 and the primary search results 306. In certain embodiments, the set of categories identified in the category identification process 308 can also be included in the derived information search 310. For example, in certain embodiments, the derived information search 310 can generate derived search results 312 that have similarity to the primary search query 302 and relate to a particular category of the identified categories.

Consistent with various embodiments, the search managing system 300 can include processing 314 of the derived search results 312. In certain embodiments, processing 314 can include filtering of the derived search results 312 to remove one or more unnecessary features. For example, one or more features of the derived search results 312 may be redundant with one or more features of the primary search results 306, and be eliminated from the set of second results. In certain embodiments, processing can also include scoring the derived search results 312 based upon their similarity with the primary search query 302. Scoring the derived search results 312 can be based on a comparison of semantic and syntactic elements of the derived search results 312 and the primary search query 302. Further, processing 314 of the derived search results 312 can include categorizing the derived search results 312 as belonging to a particular category of the set of categories identified by the category identification process 308.

In certain embodiments, the search managing system 300 can include rendering 318 of the processed derived search results 316 as well as the primary search results 306. For example, rendering 318 can include displaying the primary search results 306 and the processed derived search results 316 on a user interface device, such as a computer monitor, or the screen of a mobile device.

Figure 4:
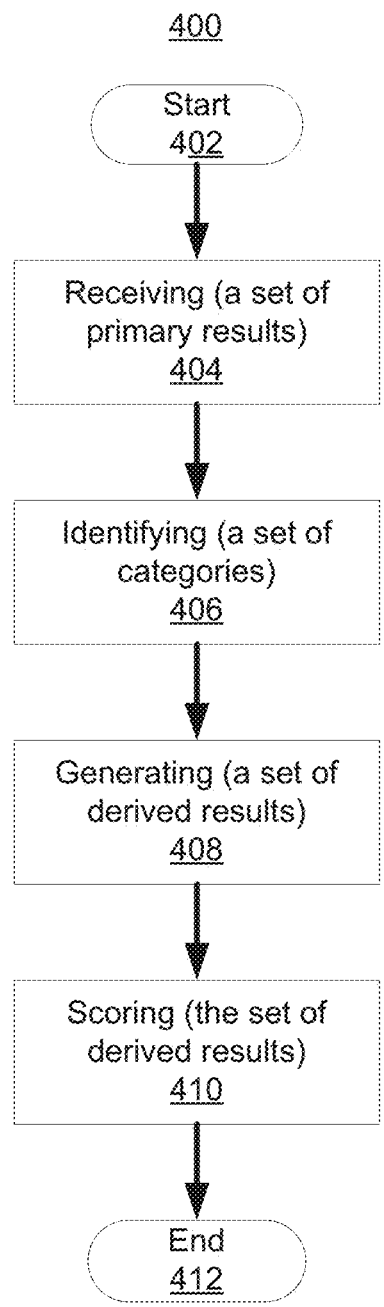
FIG. 4 is a flowchart illustrating a method for managing a search, according to embodiments.

FIG. 4 is a flowchart illustrating a method 400 for managing a search, consistent with embodiments of the present disclosure. Aspects of FIG. 4 are directed toward generating a set of derived search results in response to a primary search query. The method 400 may begin at block 402. Consistent with various embodiments, the method can include a receiving block 404, an identifying block 406, a generating block 408, and a scoring block 410.

Consistent with various embodiments, at block 404 the method 400 can include receiving a set of first results (also referred to herein as primary search results) from a first query (also referred to herein as a primary search query). The primary search query can be, for example, a web search request input by a user into an internet search engine. The primary search results can include web sites, online encyclopedias, images, videos, news articles, documents and the like. The displayed primary search results can, in certain embodiments, include summary information, keywords, and metadata tags that correspond to one or more terms in the primary search query.

In certain embodiments, at block 406 the method 400 can include identifying a set of categories based on the primary search results. Consistent with various embodiments, instructions for identifying the categories can be stored on a database (such as search management database 118 of FIG. 1) and accessed by a search management system (such as search management system 116 of FIG. 1). The method 400 can include identifying the set of categories with a natural language processing technique based on a machine learning model. The machine learning model can be trained to recognize keywords and metadata tags in the primary search results that can be used in identifying the set of categories. In certain embodiments, the natural language processing technique can be configured to analyze the summary information, keywords, and metadata tags included in the primary search results, and use syntactic and semantic elements present in these results to identify the set of categories. The syntactic and semantic elements can include information such as word frequency, word meanings, text font, italics, hyperlinks, proper names, noun phrases, and the context of surrounding words. Other syntactic and semantic elements are also possible. For example, in certain embodiments, for a primary search query that includes a named entity such as a specific place, person, or event, categories can be identified that are related to the specific place, person, or event, and offer more detailed information. A primary search query that includes the name of a specific person, for instance, could have categories related to the career, activities, and biography of that person, and a primary search query for a specific event could have categories related to the location, history, and participants of the event. As a more particular example, for a primary search query of the term "Olympics," the natural language processing technique could identify categories such as "Events," "Medal Winners," and "Locations."

Consistent with various embodiments, at block 408 the method 400 can include generating a set of second results (also referred to herein as derived results, or derived search results) using a second query (also referred to herein as a derived search query). Consistent with various embodiments, instructions for generating the set of second results can be stored on a database (such as search management database 118 of FIG. 1) and accessed by a search management system (such as search management system 116 of FIG. 1). In certain embodiments, the derived search query can be based on information from the primary search query and the set of categories. Additionally, in certain embodiments, the derived search query can be based on information from the primary search results. More particularly, the derived query can use a search algorithm to generate derived results for each of the categories identified at block 406, wherein the algorithm searches for results that correspond to the respective categories and have similarity to the primary search query. More particularly, for instance, for a primary search query of the term "Olympics" with identified categories of "Events," "Medal Winners," and "Locations," the method 400 can include searching for results that match both "Medal Winners" and "Olympics." This can be repeated for the identified categories of "Events," and "Locations," along with any other identified categories. Consistent with various embodiments, the method 400 can include filtering to remove one or more unnecessary or redundant features from the derived search results. For example, aspects of the present disclosure relate to the recognition that one or more particular features of the derived search results may have already been returned as part of the primary search results. These unnecessary or redundant features can be filtered from the derived search results.

In certain embodiments, at block 410 the method 400 can include scoring the set of derived search results. Consistent with various embodiments, instructions for scoring the set of derived search results can be stored on a database (such as search management database 118 of FIG. 1) and accessed by a search management system (such as search management system 116 of FIG. 1). In certain embodiments, the scoring can include comparing a feature of the derived search results with another feature of the derived search results, and scoring one of them higher based upon a relationship of the primary search query and the derived search results. Additionally, in certain embodiments, the scoring can also be based on the derived search query. In general, the relationship can be based on the similarity of the derived search results to the primary search query and the derived search query. More particularly, the relationship can be determined by a natural language processing technique configured to analyze syntactic and semantic elements present in the primary search query, the derived search query, and the derived search results. For example, the syntactic and semantic elements can include information such as word frequency, word meanings, text font, italics, hyperlinks, proper names, noun phrases, and the context of surrounding words. In certain embodiments, the natural language processing technique can also analyze aggregate data from a third query related to the primary search query, such as an archived search query from a past search that includes similar search criteria.

In certain embodiments, scoring the set of derived search results can further include classifying the derived search results as belonging to a particular category of the set of categories identified at block 406. For example, for a primary search query of the term "Olympics" with identified categories of "Events," "Medal Winners," and "Locations,"

a particular feature of the derived search results related to "fencing" can be classified as belonging to the "Events" category. The classification can be determined by a natural language processing technique configured to analyze syntactic and semantic elements present in the categories and the derived search results.

Method 400 may conclude at block 412. Aspects of method 400 may provide benefits associated with managing search results, such as increased search efficiency.

Figure 5:
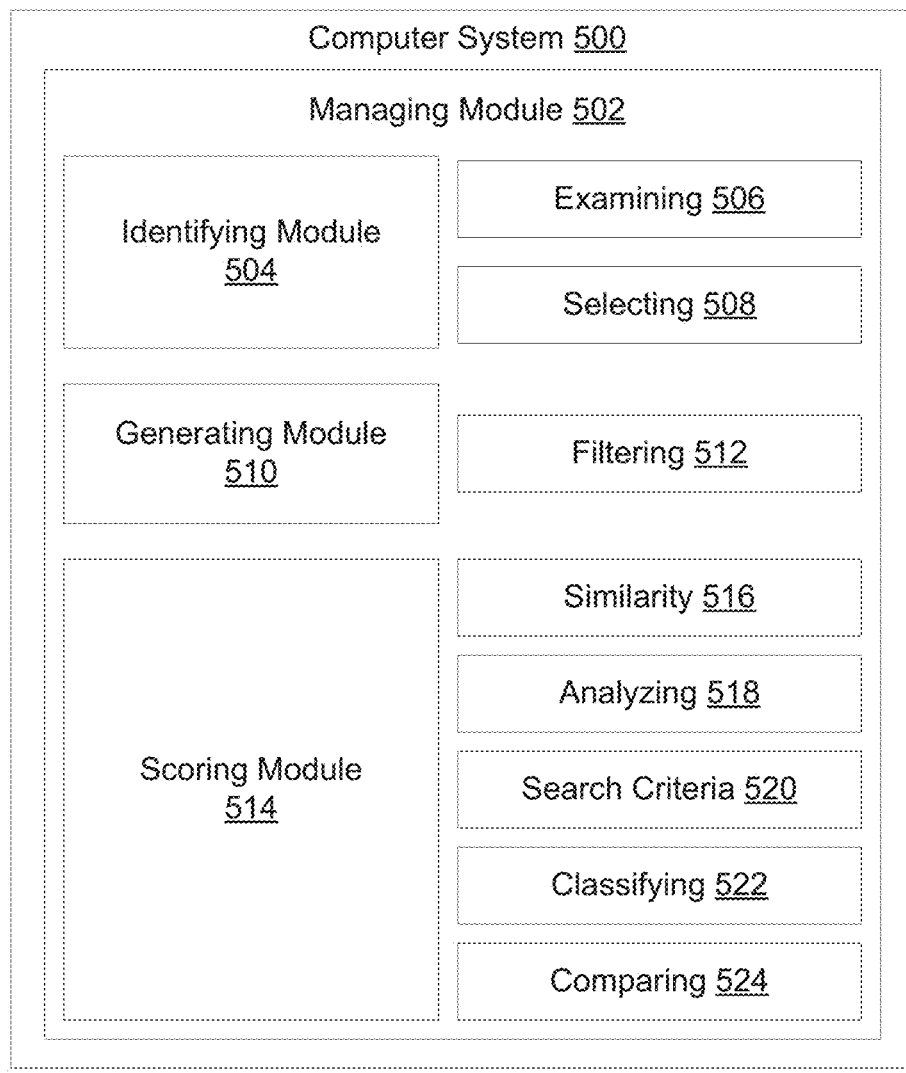
FIG. 5 illustrates modules of a system for managing a search, according to embodiments.

FIG. 5 illustrates modules of a system for managing a search, consistent with embodiments of the present disclosure. Consistent with various embodiments, method 400 can be implemented using one or more modules of FIG. 5. These modules can be implemented in hardware, software, or firmware executable on hardware, or a combination thereof. For example, these modules may be implemented on an exemplary computer system 500.

The computer system 500 can include a managing module 502. The managing module 502 can be configured and arranged to manage a search. The managing module 502 can include an identifying module 504, a generating module 510, a scoring module 514, an examining module 506, a selecting module 508, a filtering module 512, a similarity module 516, an analyzing module 518, a search criteria module 520, a classifying module 522, and a comparing module 524.

The identifying module 504 can identify a set of categories based on a set of primary search results. Identifying the set of categories can include the use of a natural language processing technique to analyze metadata from the set of primary search results. In certain embodiments, an examining module 506 can examine metadata, semantic elements, and syntactic elements present in the set of primary search results, and use a machine learning model trained to identify keywords and data tags in the set of primary search results to identify the set of categories. A selecting module 508 can allow for a particular category to be selected to filter the set of categories.

The generating module 510 can generate a set of derived search results using a derived search query based on the primary search query, the primary search results, and the set of categories. In certain embodiments, a filtering module 512 can be used to filter the derived search results, and remove at least one redundant feature of the derived search results. For example, a feature of the derived search results may be redundant with one or more features of the primary search results, and be eliminated from the derived search results.

The scoring module 514 can score the derived search results based upon a relationship of the primary search query, the derived search query, and the derived search results. The relationship can include a semantic comparison based on the similarity of textual content between the primary search query, the derived search query, and the derived search results. The relationship can be determined by a similarity module 516. An analyzing module 518 can include a natural language processing technique configured to analyze aggregate data from a search criteria module 520, a syntactic element associated with word frequency, and a semantic element associated with word meaning. The search criteria module 520 can include a third query that is related to the first query and common search criteria. A classifying module 522 can classify the derived search results as belonging to a particular category of the set of categories. In certain embodiments, a comparing module 524 can compare a feature of the derived search results with another feature of the derived search results, and score one of them higher based upon a relationship of the primary search query, the derived search query, and the derived search results. Aspects of the present disclosure provide a system of modules for managing a search that may have positive effects associated with increased search efficiency.

In addition to embodiments described above, other embodiments having fewer operational steps, more operational steps, or different operational steps are contemplated. Also, some embodiments may perform some or all of the above operational steps in a different order. The modules are listed illustratively according to an embodiment and are not meant to indicate necessity of a particular module or exclusivity of other potential modules.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although the present disclosure has been described in terms of specific embodiments, it is anticipated that alterations and modifications thereof will become apparent to those skilled in the art. Therefore, it is intended that the following claims be interpreted as covering all such alterations and modifications as fall within the true spirit and scope of the disclosure.

What is claimed is:

1. A computer program product for managing a search, the computer program product comprising a computer readable storage medium having program instructions embodied therewith, wherein the computer readable storage medium is not a transitory signal per se, the program instructions executable by a computer to perform a method comprising:
    receiving, a set of first results from a first query;
    generating, using a natural language processing technique, a set of second results using a second query having at least a portion of the first query and at least a portion of set of first results, wherein the natural language processing technique comprises a machine learning model configured to analyze the set of first results;
    scoring the set of second results based upon a semantic comparison of the set of first results, the second query, and the set of second results; and
    generating, using the scored set of the second results, a set of processed results.

2. The computer program product of claim 1, wherein the semantic elements of each of the set of first results, the second query, and the set of second results comprise at least one of word frequency, word meaning, text font, and the context of surrounding words.

3. The computer program product of claim 1, wherein the machine learning model is further configured to analyze summary information, keywords, and metadata tags included in the set of first results.

4. The computer program product of claim 1, wherein generating the set of second results using the second query includes:
    identifying, using the natural language processing technique, a set of categories based on the set of first results; and
    generating the set of second results using the second query further having at least a portion of the set of categories.

5. The computer program product of claim 4, wherein identifying the set of categories includes using syntactic and semantic elements from the set of first results and examining metadata for the set of first results.

6. The computer program product of claim 4, wherein generating the set of processed results includes:

selecting a particular category from the set of categories to filter the set of second results; and filtering to eliminate, from the set of processed results, at least one unnecessary feature of the set of second results.

7. The computer program product of claim 4, wherein the scoring includes classifying the second results as belonging to a particular category of the set of categories.

8. A system for managing a search, the system comprising:

one or more processors; and a memory communicatively coupled to the one or more processors, wherein the memory comprises instructions which, when executed by the one or more processors, cause the one or more processors to perform a method comprising:

receiving, a set of first results from a first query;

generating, using a natural language processing technique, a set of second results using a second query having at least a portion of the first query and at least a portion of set of first results, wherein the natural language processing technique comprises a machine learning model configured to analyze the set of first results;

scoring the set of second results based upon a semantic comparison of the set of first results, the second query, and the set of second results; and generating, using the scored set of the second results, a set of processed results.

9. The system of claim 8, wherein the semantic elements of each of the set of first results, the second query, and the set of second results comprise at least one of word frequency, word meaning, text font, and the context of surrounding words.

10. The system of claim 8, wherein the machine learning model is further configured to analyze summary information, keywords, and metadata tags included in the set of first results.

11. The system of claim 8, wherein generating the set of second results using the second query includes:

identifying, using the natural language processing technique, a set of categories based on the set of first results; and generating the set of second results using the second query further having at least a portion of the set of categories.

12. The system of claim 11, wherein identifying the set of categories includes using syntactic and semantic elements from the set of first results and examining metadata for the set of first results.

13. The system of claim 11, wherein generating the set of processed results includes:

selecting a particular category from the set of categories to filter the set of second results; and filtering to eliminate, from the set of processed results, at least one unnecessary feature of the set of second results.

14. The system of claim 11, wherein the scoring includes classifying the second results as belonging to a particular category of the set of categories.

15. A method for managing a search, the method comprising:

identifying a first query;

conducting, using the first query, a first search, which yields a set of first results;

identifying a set of categories based on the set of first results from the first query;

generating a derived query using at least a portion of the first query, at least a portion of the first results, and at least a portion of the set of categories, wherein the derived query is distinct from the first query;

generating, using the derived query, a set of derived results;

analyzing, with a natural language processing technique configured to analyze syntactic and semantic elements, the first query, the derived query, the set of derived results, and aggregate data from a third query related to the first query;

comparing at least one first feature of a first group of the set of derived results with at least one second feature of a second group of the set of derived results;

scoring the set of derived results based upon a relationship of the first query, the derived query, and the set of derived results; and scoring higher a selected grouping of the first and second groups that includes a similar feature, of the first and second features, to a third feature of the first query.

16. The method of claim 15, further comprising:

presenting, to a user, the set of categories;

selecting, based upon a user input, a particular category from the set of categories to filter the set of derived results; and wherein the at least a portion of the set of categories corresponds to the particular category selected.

17. The method of claim 15, wherein the third query is an archived search query from a prior search that includes similar search criteria to the first query or the derived query.

18. The method of claim 15, further comprising:

receiving, from a search application, a first query;

communicating, to a search application server, query information associated with at least one of the first query and the derived query, wherein the search application server includes search instructions comprising instructions for retrieving information associated with the query information;

receiving from the search application server, results information associated with the at least one of the first query and the derived query; and outputting the set of processed results to the search application.

19. The method of claim 18, wherein the results information comprises results of querying index data, wherein the index data comprises data identifying data to search.

20. The method of claim 19, wherein the data identifying data to search comprises at least one of categories of data and keywords.

* * * * *